United States Patent

[11] 3,622,276

[72] Inventors Eero O. A. Haahti
Helsinki;
Ilmari P. Jaakonmaki, Turku, both of Finland
[21] Appl. No. 822,233
[22] Filed May 6, 1969
[45] Patented Nov. 23, 1971
[73] Assignee Packard Instrument Company, Inc.
Downers Grove, Ill.
[32] Priorities Oct. 15, 1968
[33] Finland
[31] 2911/68;
Nov. 15, 1968, Finland, No. 3267/68

[54] CHROMATOGRAPHY SYSTEM
35 Claims, 9 Drawing Figs.
[52] U.S. Cl. ........................................... 23/230 R,
23/230 PC, 23/232 C, 23/253, 23/253 PC, 73/23.1
[51] Int. Cl. ........................................... G01n 31/08,
G01n 31/12
[50] Field of Search ........................................... 23/230,
232, 232 C, 232 E, 253, 254, 254 E, 255, 255 E,
230 PC, 253 PC; 73/23.1

[56] References Cited
UNITED STATES PATENTS
3,419,359 12/1968 Anderson et al. ............... 23/255 E X Primary Examiner—Morris O. Wolk
Assistant Examiner—R. M. Reese
Attorney—Wolfe, Hubbard, Leydig, Voit & Osann, Ltd.

ABSTRACT: Apparatus and method for particular use in thin layer chromatography (TLC). The chromatogram is developed on the inside of a tubular conduit internally coated with the combination of an adsorbent and a reactant or a catalyst capable of decomposing adsorbed compounds to gaseous products at elevated temperature. For the analysis, carrier gas is passed through the conduit and heat is applied to a selected zone. The zone is then moved along the conduit to decompose chromatographically resolved compounds, thereby changing the composition of the carrier gas stream. This composition change is determined as a measure of the composition of the chromatographically resolved mixture.

INVENTORS.
EERO O. A. HAAHTI
ILMARI P. JAAKONMAKI
BY Wolfe, Hubbard, Voit & Osann
ATTORNEYS.

INVENTORS.
EERO O.A. HAAHTI
ILMARI P. JAAKONMAKI
BY
Wolfe, Hubbard, Voit & Osann
ATTORNEYS.

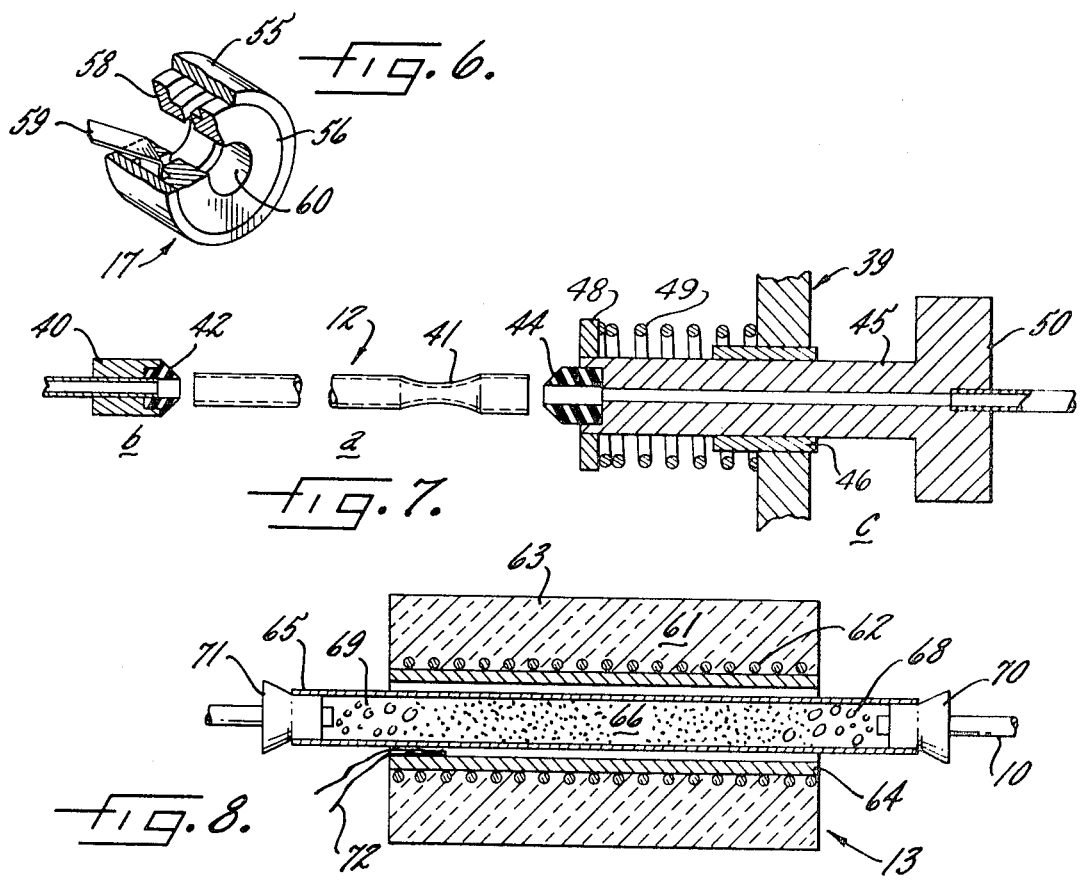
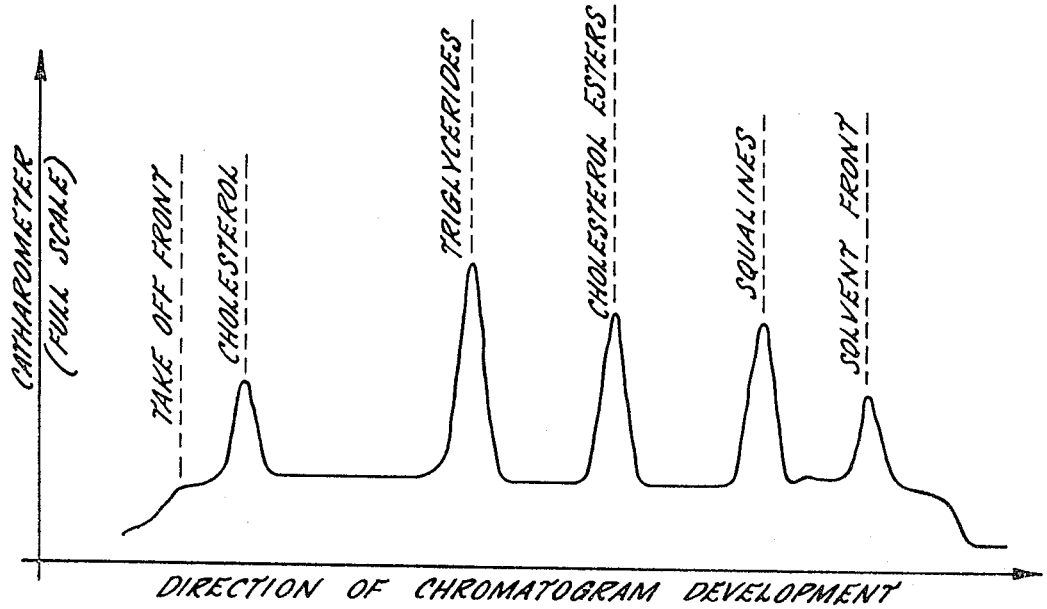

CHROMATOGRAPHY SYSTEM

CROSS-REFERENCE TO RELATED APPLICATIONS

Priority is claimed from Finland application, Ser. No. 2911/68, filed Oct. 15, 1968, and Finland application Ser. No. 3267/68, filed Nov. 15, 1968.

BACKGROUND OF THE INVENTION

The present invention relates in general to a method and apparatus for the quantitative analysis of mixtures resolved by chromatography. In its primary aspect, the invention concerns a system for resolving mixtures by thin layer chromatography (TLC) and for analyzing the resulting mixture.

Chromatography is a method for separating complex solid, liquid, or gaseous mixtures into their several constituents. The mixture is placed in contact with a finely divided stationary phase, either a solid or an immobilized liquid, and a mobile carrier fluid phase is percolated along the stationary the phase. The moving carrier fluid, either liquid or gas, exerts a force that tends to drive components in the direction of the flow, but is resisted by attractive forces between the mixture components and the stationary phase. These attractive forces tend to retard one or more of the components and, where the attractive forces differ among the components, those with stronger attractions for the stationary phase are selectively retarded. As a consequence, the components are separated into distinct regions as they migrate in the direction of carrier fluid flow. The technique is called chromatography, and the resolved mixture on the stationary substance is known as a chromatogram.

Many distinct types of chromatography are now known (see Kirk and Othmer, Encyclopedia of Chemical Technology, Vol. 5, "Chromatography," pages 413–451). Among the most important of these is thin layer chromatography (TLC), in which the stationary phase is a solid adsorbent and the carrier fluid is a liquid. TLC has proven especially useful in resolving the higher molecular weight materials involved in biochemical research, and in addition to its use as an analytical technique for resolving, identifying, and testing mixtures, it has a variety of other research applications. The literature on TLC in general, and on TLC detectors in particular, is voluminous (e.g., Haahti et al., *Acta Chem. Scand.*, 17 (1963) No. 9, 2565–2568; Cotgreave et al., *J. Chromatog*, 30 (1967) 117–124; Padley, *Chem. & Ind.*, (May 27, 1967), 874–876; Padley, *J. Chromatog*, 39 (1969) 37–46; Haahti et al., *Ann. Med. Exp. Fenn.*, 47 (1969) in press).

Notwithstanding its versatility, TLC has not heretofore achieved its full potential. The difficulty is not in resolving, or developing, the mixtures but rather in obtaining a quantitative estimation of the fractions or components so resolved. Such techniques as contacting the chromatogram with bichromate-sulfuric acid and densitometrically scanning the chromatogram, or scraping off portions of the stationary phase or adsorbent and determining the amount of solute colorimetrically, are both tedious and inaccurate. Scanning the developed chromatogram for spot area measurement, densitometry, ultraviolet absorption or fluorescence, or radioautography are often superior but necessarily are useful only for mixtures which lend themselves to these special methods. Continuing the flow of carrier liquid until the components are eluted from the stationary phase and analyzing the effluent by conventional chemical or physical techniques is unduly time-consuming. Incremental volatilization has been proposed, but is not suitable for the nonvolatile mixtures commonly subjected to TLC. Selective combustion or selective cracking of the developed chromatogram has likewise been suggested, but these have well-recognized limitations that thus far have restricted their application.

It is accordingly a major object of the invention to provide a method and apparatus for the quantitative estimation of mixtures resolved by TCL that is precise and accurate, yet routine and rapid. An associated object is to provide such a method and apparatus which has general application to a variety of mixtures and which avoids inaccuracies associated with many prior art techniques.

As noted earlier, a common limitation of most prior analytical systems is that they are useful only with specific types of materials. By contrast, an objective of the present invention is to provide a system capable of being used with diverse organic compounds and, indeed, which is virtually independent of the nature of the mixture.

A further object is to provide a novel method and apparatus for analyzing a chromatographically developed mixture, which method and apparatus provide a response that is independent of the specific nature of the constituents in the mixture. Where the response of a detector is a function of the composition of a chromatographically resolved component, the detector must be standardized for each such component. In accordance with the invention, an object is to provide a chromatography system the response of which depends only on the elemental composition of the mixture components.

Associated with the last-mentioned object, an additional object of the invention is to provide a chromatography analysis system which can be standardized for quantitative analysis of an abundance of components by using only a single standard sample.

Still a further object is to provide a versatile TLC chromatographic analysis system which avoids contamination and other sources of inaccuracy and which is accordingly capable of achieving the highest accuracy possible with TLC.

BRIEF DESCRIPTION OF DRAWINGS

Other and further objects and advantages of the invention will become apparent as the following description proceeds, taken in conjunction with the accompanying drawings in which:

FIG. 6 is an enlarged view, partly in section, showing the combustion heater;

FIG. 7 shows an enlarged sectional view of the TLC column (FIG. 7a) and the fixed (FIG. 7b) and movable (FIG. 7c) holders for the column;

FIG. 8 is an enlarged sectional view of the secondary combustion furnace 13, as shown in FIGS. 1, 2, and 4; and FIG. 9 is a typical chromatographic readout.

Figure 1:
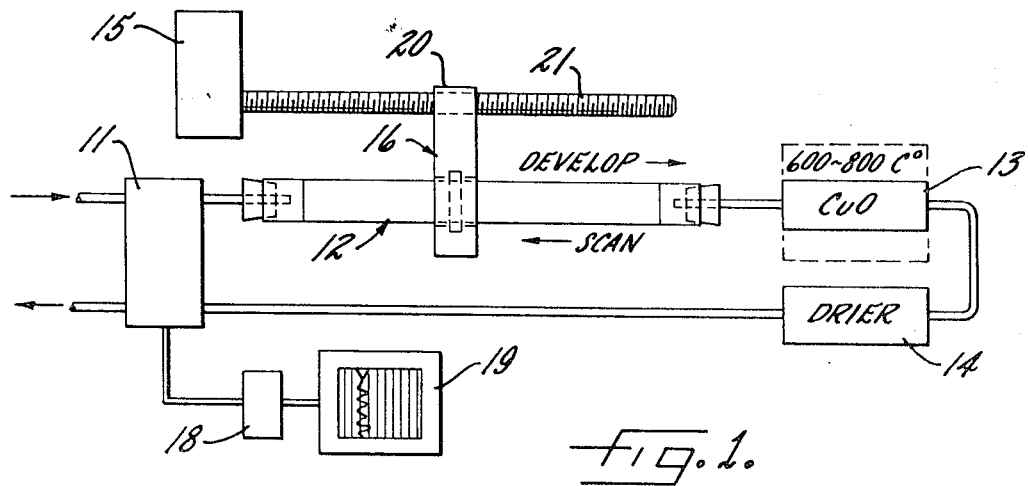
FIG. 1 is a generalized diagrammatic representation of a simplified TLC analysis system according to the invention.

While the invention is susceptible of various modifications and alternative forms, specific embodiments thereof have been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention as expressed in the appended claims.

THE SYSTEM

Discussing the illustrative embodiment in detail, it will be helpful first to discuss in broad terms the system of the invention, with regard both to method and apparatus.

As indicated earlier, TLC systems essentially involve, first, a system for developing the chromatogram or, in other words, resolving the several components or fractions of a mixture into a chromatogram, and second, a system for analyzing the resolved chromatogram. As the present invention is concerned with improvements to both the development and the analysis aspects, these will be segregated in the initial discussion below.

In TLC, the chromatogram is developed by depositing a small amount of a mixture onto a stationary substance, usually a finely divided solid adsorbent, and flowing a liquid carrier solute along the adsorbent to resolve the mixture into one or more fractions or components. TLC absorbents have included both inorganic materials such as silica gel, alumina, and molecular sieves, or organic adsorbents such as cellulose.

In keeping with one aspect of the invention, the TLC adsorbent is disposed as an internal coating on an elongated tubular conduit, shown schematically as chromatography tube 12 in FIG. 1 and, in more detail, in FIG. 7a.

Initially, before the chromatography tube 12 is installed in the apparatus, the chromatogram of a mixture is developed by placing a small amount of the mixture at one end of the tube 12, and immersing that end in a beaker of appropriate solvent which, as it rises by capillarity in the adsorbent, chromatographically resolves the initial mixture. The final chromatogram appears in the tube as a series of spaced bands, with each band composed of one or more constituents of the original mixture.

The spacing of the bands depends, in known manner, on the properties of the adsorbent, the composition of the initial mixture, the nature of the solvent, and conditions of chromatographic development. Choice of adsorbent, solvent, and development condition may be made by reference to published literature or by trial and error experiment.

According to one feature of the invention, the material constituting the internal surface of the chromatography tube 12 is a coating comprising the combination of a chromatographically active adsorbent such as alumina or silica gel, and a substance capable of decomposing adsorbed compounds to gasiform products at elevated temperature. By way of example, the substance capable of decomposing adsorbed compounds is an oxidant such as one of the metal oxides where the metal is in a higher oxidation state, such as for example cupric oxide or manganese dioxide. Suitable compositions and conditions will be discussed subsequently in connection with an illustrative apparatus embodiment of the invention.

The nature of the gasiform product or products obtained upon heating a chromatogram developed on a combination of an active adsorbent and a decomposing substance depend on both the composition of the initial sample mixture and on the type of decomposing substance. For most purposes the constituents of the initial mixture are organic compounds and therefore contain combined carbon and hydrogen, and accordingly an oxidant capable of converting the carbon to carbon dioxide gas and the hydrogen is water is most advantageously used.

Once the chromatogram has been developed, and after chromatographic solvents have been removed by evaporation or by heating the tube 12 above the solvent boiling point, the chromatography tube 12 is installed in an apparatus schematically depicted in FIG. 1. Directing attention to this figure, a system is illustrated for analyzing a chromatogram developed by TLC. The chromatography tube 12 is installed in a gas conduit 10 so that carrier gas, illustratively helium, flows longitudinally through the chromatography tube 12, then through a supplemental combustion capsule or heater 13, then through a water trap or drier capsule 14, and finally through a carrier gas detector such as a thermal conductivity catharometer 11.

The catharometer 11 is of the typical heated filament type, with one filament exposed to the carrier gas of conduit 10 before the gas passes into and through chromatography tube 12, while the other or detector filament is in the conduit 10 downstream of the tube 12. As the carrier gas composition changes when gases of composition different from that of the carrier gas stream are introduced, the thermal conductivity of the resulting gas changes, and this in turn changes the temperature of the heated detector filament in the catharometer 11. Since the two filaments in the catharometer 11 are initially balanced in a bridge circuit—corresponding to the same gas passing over each filament—any change in gas composition alters the thermal conductivity of the gas entering the detector filament and changes the temperature of this filament. The resulting unbalance is detected by a bridge and power supply 18, and is recorded on a strip chart recorder 19.

To analyze a developed chromatogram with the chromatography tube 12 installed in the apparatus schematically depicted in FIG. 1, a heated zone is provided at one portion or region of the chromatography tube 12, and the zone is gradually advanced longitudinally along the chromatography tube 12. As the mixed adsorbent and substance capable of decomposing adsorbed compounds is heated, the latter becomes active, and decomposes components of the developed mixture. Normally gaseous or vaporous products of lower molecular weight are produced, and enter the carrier gas stream flowing through the tube 12.

As the heated zone is progressively moved along the chromatography tube 12 in the direction indicated by "scan" in FIG. 1, progressive or successive increments of the chromatogram are decomposed. Since the decomposition and related gas evolution contributed gas to different segments of the carrier gas stream, the resulting effluent carrier gas will have a composition that varies in relation to the location of each resolved mixture fraction on the chromatogram and to the quantitative amount of that fraction.

To advance the heated zone along the chromatography tube 12, a scanning combustion unit 16 is provided, as shown in FIG. 1. This combustion unit 16 includes an electrical heating strip 17 surrounding a limited portion of the chromatography tube 12. The combustion unit 16 is fixed to a ball nut 20 threaded onto a ball screw 21, the ball screw 21 being driven at a constant rate of speed by a synchronous motor 15. Accordingly, as the motor 15 rotates the ball screw 21, the ball nut 20 and its associated scanning combustion unit 16 move in the scan direction along the chromatography tube 12 and heat progressive increments of the chromatogram.

Where, as is most common, the mixture undergoing TLC is organic in nature and contains both carbon and hydrogen atoms, oxidation by the oxidant comingled with the adsorbent in chromatography tube 12 is effective to convert substantially all of the carbon to carbon dioxide and substantially all of the hydrogen to water. To insure that combustion is complete, a secondary or supplemental combustion capsule 13 is provided downstream of the chromatography tube 12. The capsule 13 contains cupric oxide on an inert support, and is heated to about 600°–800° C. Incompletely oxidized carbon in the form of carbon monoxide or intermediate oxidation products, as well as unconverted hydrogen, are completely oxidized by the supplemental combustion capsule 13 to carbon dioxide and water, respectively. Optionally, the capsule 13 additionally contains some copper metal to combine with oxygen gas and avoid erroneous readings caused by the unintentional presence of $O_2$.

Ordinarily, water vapor is present in the effluent gas as both a product of the oxidation and as water desorbed from the adsorbent. As the catharometer 11 responds to any gas foreign to the initial carrier gas, a water trap capsule 14 is provided to remove water vapor and permit only the initial carrier gas and carbon dioxide to enter the catharometer 11. The capsule 14 contains a porous dessicant drier such as calcium chloride, phosphorous pentoxide, or other adsorbent drier.

Apparatus as described above and as shown in FIG. 1 has been demonstrated to have a unique ability to analyze quantitatively organic mixtures resolved by TLC. Analysis of lipids is described below.

The chromatograph tube 12 (FIG. 1) is made of thin wall (0.3–0.6 mm.) Pyrex glass of quartz, 6 mm. i.d. and 200 mm. in length. The inner walls of the tubes are coated with a slurry of silica gel (Adsorbosil-2, Applied Science Laboratories, State College, Pa.) and cupric oxide (fine powder, Merck, Darmstadt) in methanol-water (approximately 5:1). Usually the proportion of cupric oxide is about one-fourth to about one-half of the weight of the silica gel. After coating and drying, the tubes are activated at 120° C.

Samples (1-100 mg. of lipid mixtures are applied onto the adsorbent layer either with a microsyringe or by dipping the end of the tube into a 0.1-0.5 percent solution of the lipids in benzene, allowing the support to adsorb a zone of 3-4 mm. width of the solution. The sample zone is subsequently sharpened and brought to a suitable starting height by developing with chloroform-methanol (2:1). The chromatograms are developed one or more times with benzene and/or hexane in the conventional manner. After removing the solvent, as for example in a vacuum desiccator or by heating under inert gas flow, the tubes are ready for scanning.

A scanning device is constructed according to the schematic of FIG. 1. A nonreactive carrier gas (helium at 20-40 ml./minute) enters the reference side of the catharometer 11 and passes through the chromatography tube 12 which is connected to the system with gastight silicone rubber seals. The complementary combustion capsule 13 contains cupric oxide at 600°-800° C., and the water trap capsule 14 is packed with calcium chloride.

A synchronous motor 15 drives the combustion unit 16 surrounding the chromatography tube 12. The unit 16 contains a kanthal heating tape (AP Kanthal, Hallsthammar, Sweden, Pat. No. 9,755,560) loop at 1-1.5 mm. distance from the tube 12. The loop is mounted in a block of Marinite designed so that heat radiated from the glowing loop is limited by a slit to give a narrow circular heat zone of about 1-2 mm. around the circumference of the chromatography tube 12. The temperature of the tape loop is regulated with a low-voltage variac to red glow, requiring approximately 4v. and 9a.

After equilibration of the system, the tube is scanned at a speed of, for example, 1.0 cm./min. by advancing the combustion unit 16 along the ball screw 21. The heater 17 thereby heats the chromatogram progressively, causing the cupric oxide to oxidize the organic solute zones to carbon dioxide and water. The helium carrier gas conveys the combustion products through the complementary combustion capsule 13 for any further oxidation, and thence to the water trap capsule 14 for water vapor removal by calcium chloride.

Following the water trap capsule 14 the carrier gas, now containing carbon dioxide from oxidation of the chromatogram, passes to the detector filament of a catharometer 11 (Aerograph, USA).

Response of the described apparatus is essentially linear with the number of carbon atoms in each chromatographically resolved fraction. As the composition of each fraction is generally known, it is thus possible to measure the chromatogram peak height or area and, by simple computation, to determine quantitatively the proportion of each fraction present in the initial mixture.

Verification of the precision and accuracy of the present system for the analysis of synthetic and natural mixtures of lipids have been demonstrated in several ways. First, a second can of the same tube gives on chromatogram on the recorder 19. Second, mass spectrometric analysis of effluent gases shows the carbon dioxide spectrum but no larger fragments. Third, standard carbon dioxide samples have shown excellent agreement with known amounts of standard lipids. Fourth, analysis of standard mixtures of various lipids show quantitative recoveries when calculated on an absolute basis or as relative contents of solute fractions. Fifth, combustion of carbon-14 labeled lipids show quantitative recoveries of carbon-14 dioxide. Sixth, injection of either hydrogen or water gives no response.

A TLC of a reference lipid mixture containing squalene, cholesteryl palmitate, tristearin and cholesterol is shown in FIG. 9. In this case the chromatogram is developed from left to right and is scanned from right to left, although either or both directions may be reversed. Residual solvent (benzene or benzene-hexane, 5:95), is detected first, and the remaining fractions follow. The sample size is approximately 50-80 mg.

For more convenient operation, the apparatus described earlier in FIG. 1 functions semiautomatically, and is described in conjunction with FIGS. 2 through 8, inclusive. The elements of the semiautomatic apparatus are designated with the same numerals corresponding to similar elements of the apparatus of schematic FIG. 1.

Figure 2:
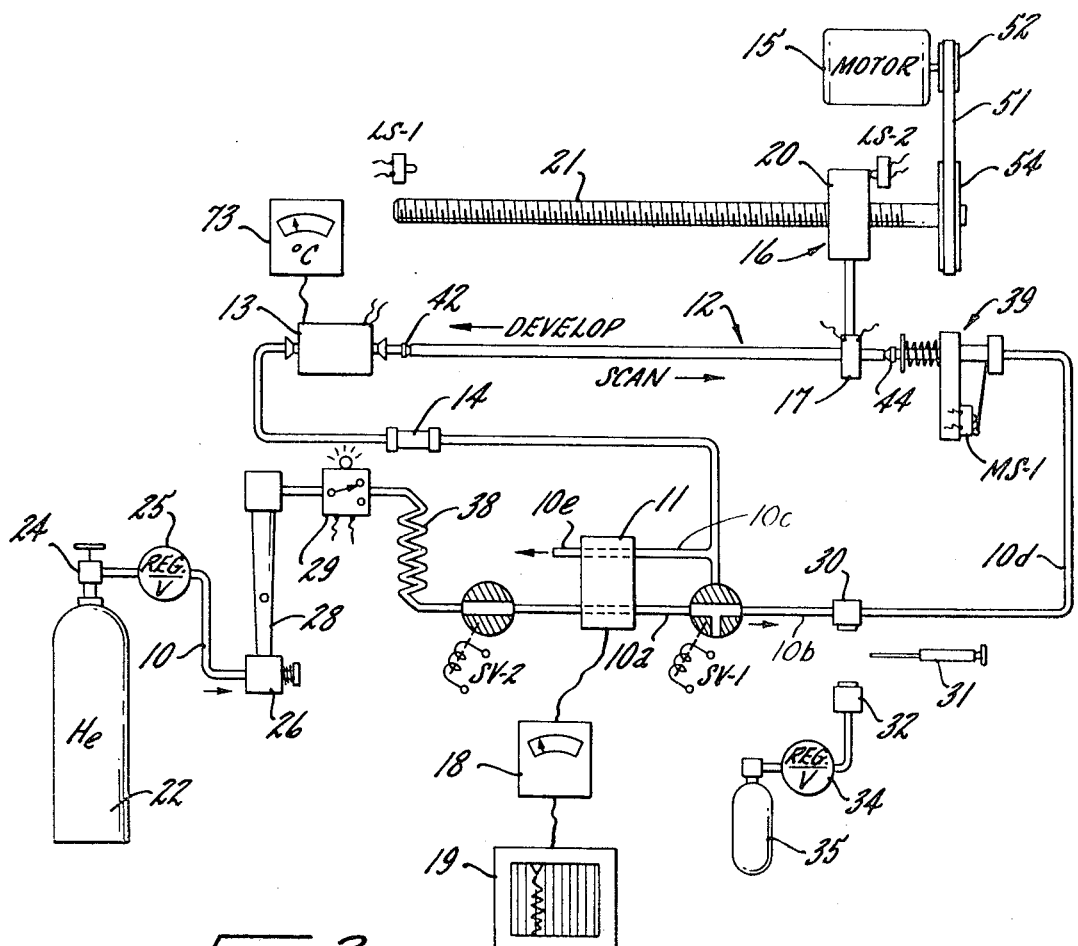
FIG. 2 is a diagrammatic representation of the preferred embodiment of the invention, featuring semiautomatic operation and analysis.

Turning attention to FIG. 2, the arrangement is generally similar to that of FIG. 1 except where noted. An inert carrier gas, that is, one that reacts with neither the substance capable of decomposing adsorbed compounds nor with the compounds or their gasiform products, is admitted from storage container 22. Conveniently, the container 22 is a high-pressure helium tank, provided with a tank valve 24 and a pressure regulating valve 25. From the pressure regulating valve 25, the carrier gas conduit continues to a manual flow regulator valve 26 associated with a ball-float-type flowmeter 28, capable of indicating flows in the range of about 1 to about 100 ml. per minute at standard conditions.

After leaving the flowmeter 28, the helium carrier gas is presented to a low-pressure switch 29 and then to a pressure-reducing restriction 38. Should the gas pressure at pressure switch 29 fall below a predetermined minimum, the switch 29 opens and turns off all electrical power to the system, thereby protecting the thermal conductivity cell (catharometer 11) filaments. Additional protection against system damage by low helium gas pressure is afforded by the solenoid valve SV-2 which is open only when electrical power is available.

Leaving solenoid valve SV-2, the carrier gas flows to the reference side of a catharometer, or thermal conductivity detector, 11. The measuring or detector element of the catharometer 11 is in an electrical bridge circuit with the corresponding reference element, and bridge imbalance is detected in power unit 18 connected to the strip chart recorder 19 which records the analysis.

Carrier gas leaving the catharometer 11 via conduit 10a and flows through a three-way solenoid valve SV-1. When an analysis is being performed, the solenoid valve SV-1 transmits helium carrier gas via conduit 10d to the chromatography tube 12. However, when the tube 12 is removed from the system, the solenoid valve SV-1 is activated by position microswitch MS-1 to direct helium from conduit 10a through conduit 10c instead of 10d, and thence into the detector side of the catharometer 11. This avoids exposing the reference element to atmospheric oxygen.

In its operative position, the solenoid valve SV-1 transmits the helium carrier gas via conduit 10b to a standardizing sample injection port 30. This port is a rubber septum through which a predetermined amount of a standardizing gas sample of a carbon-containing gas such as $CO_2$ may be injected via gas syringe 31, advantageously a 50 microliter gas syringe. The carbon dioxide supply is obtained from a carbon dioxide supply port 32 connected via a pressure regulator 34 to the small carbon dioxide supply ampoule 35 (Norgren No. 11-=).

Leaving standardizing sample injector port 30, the carrier gas is conducted via conduit 10d to the chromatography tube 12 and its associated chromatography tube mounting apparatus 39, 40, all of which are shown in enlarged section in FIG. 7a, FIG. 7b, and FIG. 7c.

Directing attention to FIG. 7a, the chromatography tube 12 is a thin-wall temperature-resistant-glass tubular conduit, advantageously circular in cross section, of 200 mm. length and 6 mm. o.d. It may be made, for example, of Pyrex, Vycor, or a borosilicate glass, and advantageously has a wall thickness on the order of 0.0035 inch. Tube wall thicknesses on the order of about 1 mm., and tube diameters of from one-sixteenth to about one-half inch, are available and may be used where desired.

As shown in FIG. 7a, one end of the chromatography tube 12 is necked down at 41 to an inner diameter of about 1 mm. at a distance of about 15 mm. from one end of the tube. As will be described, this facilitates distribution of the sample mixture to be analyzed chromatographically.

Preparing the chromatography tube 12 for TLC involves depositing on the inner walls of the tubular conduit 12 the combination of a chromatographically active adsorbent and a substance capable of decomposing adsorbed compounds to gaseous products at elevated temperature. The nature of the adsorbent and of the decomposing substance in large part determine the manner of applying them to the tube.

For the analysis of high molecular weight carbonaceous compounds such as lipids, a mixture of 60 percent by weight powdered silica gel (300 mesh) and 40 percent cupric oxide has proven to be satisfactory. The powders are mixed well and then slurried in 10 percent methanol or acetone-90 percent water. With the powders in suspension, the slurry is aspirated up into the glass tube and then permitted to drain. The resulting deposit is dried to form a thin layer suitable for TLC. Ordinarily, the layer is about 0.05 to about 1 mm. thick, but the thickness is not of major significance for most TLC resolutions.

After the tube is coated or otherwise provided with the adsorbent and the decomposing media, it is advantageous to activate the tube and remove water or other solvents. With the acetone-water mixture described above, drying at 110° C., for several hours, preferably in a moving nitrogen atmosphere, is recommended. Further heating, up to about 750° C., in an inert nonoxidizing atmosphere is preferred where there is a possibility of foreign organic material being included in the adsorbent and which would otherwise interfere with the analysis.

Other stationary adsorbent-decomposing substance phases may be deposited in similar manner. The composition is selected to provide the desired adsorption and the required reaction or catalysis of the adsorbent sample components. Aluminum oxide with various oxidants, molecular sieve adsorbents either with separate oxidants such as cupric or manganic oxide or with an internally adsorbed noble metal cracking catalyst, are useful for many organic analyses. Where the chromatogram is to be cracked with a cracking catalyst, the carrier gas is preferably hydrogen, and the effluent gas is analyzed for methane.

Other substrates may be composited with decomposing substances for specific analyses. Argentation chromatography, where resolution of the mixture depends at least in part upon the selective affinity of mixture fractions for silver, may be effected with a mixture of silicic acid powder and pulverized cupric oxide which has been impregnated with a 20 percent aqueous silver nitrate solution. Selective decomposition reactions, as for example decarboxylation, deammination, dehalogenation, dehydro-halogenation, etc., may be carried out by incorporating the appropriate catalyst or reagent with the adsorbent, and by utilizing a suitable detector system for the evolved gaseous product. Binders such as calcium sulfate may be used, provided they do not interfere with chromatographic resolution or with the subsequent decomposition and analysis of the developed chromatogram.

It is also within the scope of the invention to utilize one material as both the TLC adsorbent and the decomposing medium. Thus, for example, certain metal oxides are available as high surface area powders with adsorptive properties suitable for TLC. Conversely, some adsorbents such as platinum-impregnated alumina are both adsorbents and cracking catalysts.

To introduce a sample into the chromatograph tube 12 of FIG. 7a, a microsyringe is used to place a small quantity of the sample, or of a solution of the sample, at the necked portion 41. Placing the tube 12 upright in a bath of an appropriate solvent causes the solvent to diffuse upward and thereby develop the mixture components into a series of bands at different distances along the tube 12. To terminate development the tube 12 is merely lifted from the solvent, and the solvent removed by evaporation or by heating to about 100° C., or higher. In some instances improvement in reducing background signals is obtained when development is followed by heating the tube 12 in a stream of helium at 100° C., for several minutes, apparently to remove absorbed atmospheric nitrogen and oxygen as well as to remove last traces of solvent.

Returning to FIGS. 7a, 7b, and 7c, the chromatography tube 12 is interposed between the fixed holder 40 and the movable holder 39, where tapered resilient seals 42, 44 in the respective holders establish a gastight relationship. The seals 42, 44 are advantageously of silicone rubber or similar temperature-resistant flexible material. As shown in FIGS. 2 and 7c, the movable holder 39 comprises an axially movable stem 45 inserted in a sleeve 46. The stem 45 has, at its end facing the chromatography tube 12, a flange 48 against which a spring 49 bears, tending to urge the stem 45 in a direction toward the chromatography tube 12. The opposite end of the stem 45 is provided with a flange or knob 50 which contacts microswitch MS–1 (FIG. 2) when there is no chromatography tube 12 in place. This microswitch MS–1 is in circuit with solenoid valve SV–1 (FIG. 2 and FIG. 3) so that when no tube 12 is present and the movable stem 45 of the movable holder 39 (FIG. 7c) is extended, the solenoid valve SV–1 is deenergized and directs the helium carrier gas into conduit 10c to protect the filament of the catharometer 11.

Progressive heating of the chromatography tube 12 (FIG. 2) is effected by movement of the scanning combustion unit 16 and its associated heater 17. The combustion unit 16 is carried by a ball nut 20 threaded onto a knuckle screw 21, which is rotated by a stepping motor 15 via a notched drive belt 51 and pulleys 52, 54. Rotation of the motor 15 (Slo Syn synchronous motor, Superior Electric Co., Bristol, Conn. wiring diagram DM 144509) thus moves the scanning combustion unit 16 and the heater 17 longitudinally along the chromatography tube 12.

As shown in FIG. 2, a pair of limit switches, LS–1 and LS–2, are arranged to contact the scanning combustion unit 16 at, respectively, the beginning and end of the scan. Presently the circuit connections of these limit switches will be discussed.

Figure 5:
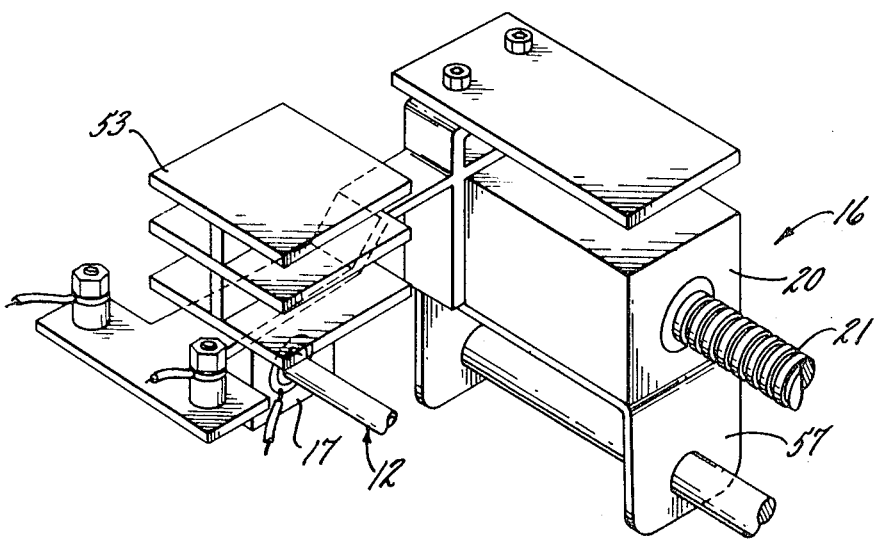
FIG. 5 is an enlarged view of the travelling combustion unit 16 shown in FIGS. 1, 2, and 4.

FIG. 5 depicts the scanning combustion unit 16 in enlarged perspective. The ball nut 20 receives a ball screw 21 (FIG. 2) and moves back and forth along the chromatography tube 12 (FIG. 2) carrying the heater 17 along the tube. To avoid direct contact of the heater 17 with the tube 12, slides 57 accommodate a guide rod disposed beneath the ball screw 21 (FIG. 5). Thermal insulation of the heater 17 from the ball nut 20 is provided by a radiator or finned heat sink 53, as shown.

Turning to FIG. 6, the heater 17 on the scanning combustion unit 16 is depicted in an enlarged sectional view. The heater 17 is composed of a refractory cylinder 55 and a pair of refractory discs 56, 58 defining a collimated radial furnace containing a circumferential nichrome wire ribbon or strip 59 ⅛ inch wide by 0.005-inch thick. The ends of the strip 59 extend through the clearance space between the discs 56, 58 and the cylinder 55, which otherwise is sealed with a suitable ceramic cement. The axial hole 60 in the heater 17 is of sufficient size to freely accommodate the chromatography tube 12 (FIG. 2).

Returning again to FIG. 2, gas leaving the chromatography tube 12 (in the "develop" direction) then flows to the auxiliary combustion capsule 13 where, at a temperature of about 700°–800° C., additional oxidant, e.g., cupric oxide 1:1 on diatomaceous earth, completes the oxidation of CO and volatile carbonaceous compounds to carbon dioxide. As shown in detail in FIG. 8, the combustion capsule 13 comprises a canister 63 containing insulation 61 surrounding a heating coil 62 wrapped around a seven-sixteenths inch I.D. ceramic tube 64. The tube 64 is sufficiently large to receive a temperature-resistant glass cylinder 65 confining the cupric oxide diatomaceous earth 66. This oxide-earth mixture is maintained in position by quartz wool plugs 68, 69 at the respective ends of the tube 65. Sealing of the conduit 10 to the tube 65 is effected by silicon rubber septa plugs 70, 71.

A thermocouple 72 inserted within the combustion capsule 13, preferably directly in the region between the tubes 64, 65, assists in maintaining regulation of the secondary oxidation temperature. The thermocouple 72 is connected to a suitable indicator 73 (FIG. 2).

Leaving the combustion capsule 13, the carrier gas stream flows to a drier 14 for removal of water of combustion. The drier 14 contains porous calcium chloride, alumina, or other desiccant or adsorbent, and is conveniently so constructed as to permit facile replacement of the drying agent. An adsorbent filled U-tube, with rubber septa at each end (see drier 14 in FIG. 2), provides ease of replacement when the dessicant or adsorbent is exhausted.

As indicated, a dessicant or adsorbent is employed to remove water vapor where the analysis is for carbon dioxide. Alternatively, should it be desired to analyze for water, a carbon dioxide adsorbent may be employed. Similarly, adsorbents for other reactive media may be selected to either remove or transmit sulfur oxides, nitrogen, phosphine, or the like, where the analysis is for sulfur, nitrogen, phosphorous, etc. in the initial sample mixture.

From the drier or water trap capsule 14, the gas flows directly to the detector element of the catharometer 11. Here, changes of composition of the carrier gas produced by the scanning oxidation system are detected as variations in gas thermal conductivity (or other characteristic of the gas), and the detected signal is ultimately recorded on the strip chart recorder 19.

Alternatively, or in conjunction with a catharometer (or other gas composition change detector such as a paramagnetic oxygen analyzer or the like), where the initial sample mixture contains a radioactive nuclide, the carrier gas leaving the system via conduit 10e be passed through a radiation detector such as a gas proportional detector, a gas scintillation detector, or an adsorbent for subsequent liquid scintillation detection. By this means, chromatographic analysis may be applied directly and quantitatively to radio-tagged samples.

Combinations of analyzers may be employed to analyze simultaneously for two or more components of the effluent gas. Thus, for example, hydrocracking of amines produces methane and ammonia, and after detection of both gases with a thermal conductivity cell the ammonia may be removed with an acidic reagent and the effluent again analyzed with a similar cell for methane alone. Ammonia is then determined by difference.

Figure 4:
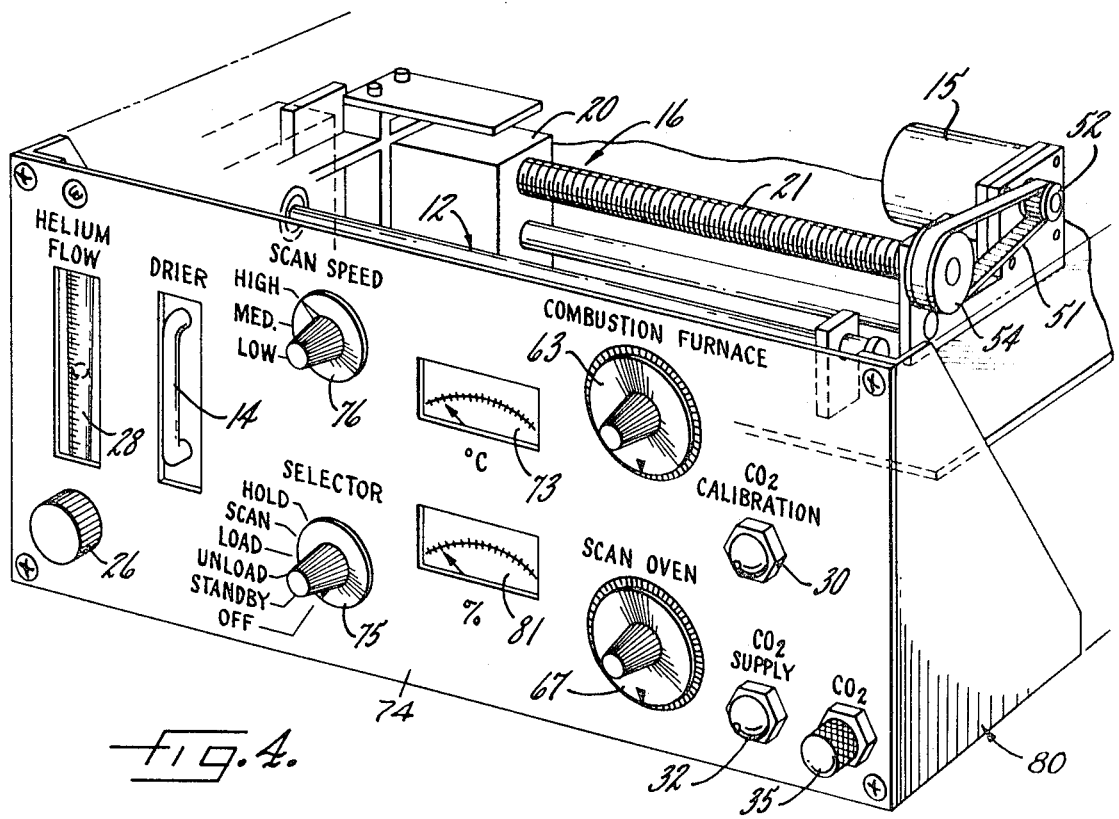
FIG. 4 is a perspective view of the complete apparatus of FIG. 2.

The apparatus for semiautomatically performing an analysis of a TLC chromatogram is depicted in FIG. 4, with the elements previously described in FIG. 2 and FIGS. 6 through 8, inclusive, being similarly identified by corresponding numbers. The apparatus 80 generally comprises a control panel 74, behind which are located most of the system components. The selector switch 75 governs the operative mode of the system, and will be explained immediately.

Figure 3:
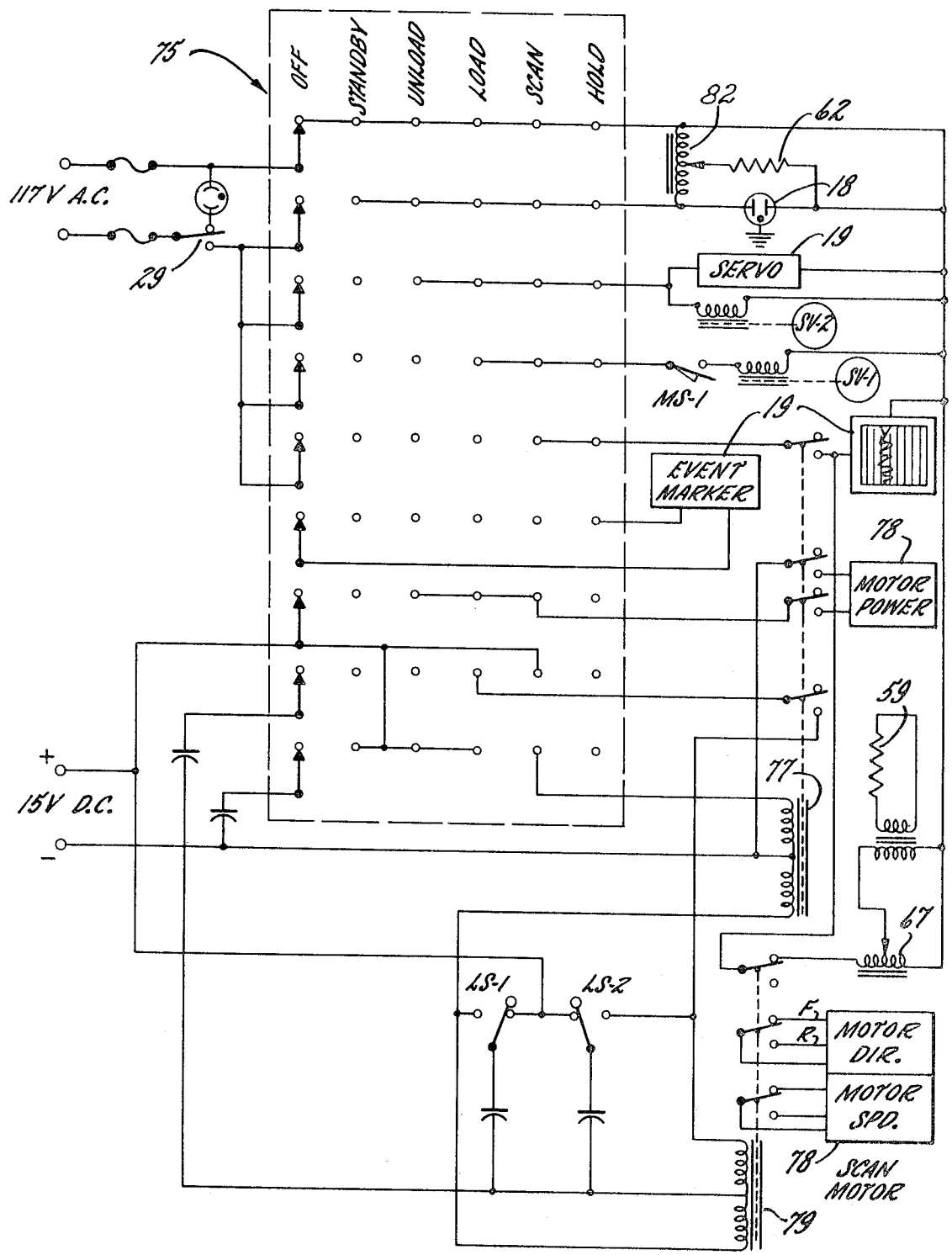
FIG. 3 is an electrical circuit diagram for use with the embodiment of FIG. 2.

As shown in FIG. 4, the selector switch 75 has six positions namely "Off," "Standby," "Unload," "Load," "Scan," and "Hold." FIG. 3 depicts a circuit diagram showing the selector switch 75 as a ganged switch receiving AC and DC power and transmitting the power to the several components of the apparatus. By way of explanation, the "motor power," "motor dir.," and "motor spd." blocks illustrate motor power, direction, and speed control for the stepping motor (15 on FIG. 2). The functions of selector switch 75 are best discussed in relation to the individual modes.

Off—In this position power is supplied only to the low helium pressure switch 29 and to its associated pilot light.

Standby—In this position and in all subsequent positions, 117 volts AC is applied through the variac 82 to the heating coil 62 (FIG. 8) of the combustion capsule 13 (FIG. 2) so as to maintain the coil 62 at normal operating temperature, and to the catharometer 11 power supply 18 (FIG. 2; e.g., Packard Model 839). In this and in all other positions of the selector switch 75, low helium pressure indicated by the pressure switch 29 overrides all other operations of the system and terminates power to the entire system.

Unload—This is the position normally used when inserting or removing a chromatography tube 12 in the system of FIG. 2 or 4. In this and in subsequent positions of the selector switch 75, power is supplied (a) to the recorder 19 servo system, (b) to the catharometer 11 filaments, and (c) to the solenoid valve SV-2 which allows carrier gas to flow through the catharometer 11.

When selector switch 75 is in the "Unload" position or when not tube 12 (FIG. 2) is in place, the microswitch MS–1 is closed, thereby deenergizing the solenoid valve SV–1 (FIG. 2) to bypass helium gas around the chromatography tube 12 and directly into the catharometer 11 via conduit 10c.

Load—The "Load" position allows gas to flow through the tube 12 (FIG. 2) but without heating the tube. In the "Load" position, the solenoid valve SV–1 is energized to transmit helium through the chromatography tube 12 when, but only when, the microswitch MX–1 is open, corresponding to the presence of a tube 12 between the fixed holder 40 and the movable holder 39. Once the tube 12 is in place, the microswitch MS–1 is opened and helium then flows through the complete system as described earlier. In the event the tube 12 were to break or inadvertently be removed, the microswitch MS–1 closes, causing the solenoid valve SV–1 to close and bypass helium through the catharometer 11.

Scan—"Scan" is the position in which the scanning combustion unit 16 moves from the left to the right in FIG. 2 thereby progressively heating successive increments of the tube 12 to oxidize or otherwise decompose the developed chromatogram and to produce a detectable change in gas composition.

From its initial position to the left end of the ball screw 21, the scanning combustion unit 16 advances at a preselected "low," "medium," or "high" constant rate, the rate being determined by appropriate positioning of the scan speed switch 76 (FIG. 4) which selects one of three pulse rates for the motor 15 (FIG. 2) by prior adjustment of motor speed control potentiometers 78 (FIG. 3).

Movement of the scanning combustion unit 16 (FIG. 2) is initiated by moving the selector switch (FIG. 3) to the "Scan" position. As shown in FIG. 3, this applies a 30-volt pulse to magnetic pulse latch relay 77 which controls the power to the motor 15 (FIG. 2). In the "Scan" position power is also applied to the recorder 19 (FIG. 2) chart drive motor.

When the scanning combustion unit 16 has moved completely to the right end of the tube 12 of FIG. 2, the unit 16 trips limit switch LS–2. As shown in FIG. 3, this reverses the latch relay 79 position, causing the motor 15 (FIG. 2) to reverse its direction and return the scanning combustion unit 16 at a fairly rapid speed to the left position of FIG. 2. When the scanning combuster unit 16 reaches the extreme left position it trips limit switch LS–1, stopping the chart drive on the recorder 19 (FIG. 2) which simultaneously unlatches latch relay 77 and returns latch relay 79 to the forward position, thereby preparing the system for an additional scan when so directed by the selector switch 75. This may be initiated when necessary by returning the selector switch 75 to the "Load" position and then again placing it in "Scan."

The "Scan" position additionally applies power to the motor 15 (FIG. 2) speed and direction circuits 78 and to the scanning combustion heating filament 59 (FIG. 6), the latter via the variac control 67 (FIG. 4) as measured by a meter 81. Lastly, power is supplied to drive the recorder 19 (FIG. 2) chart drive motor.

Hold - In this position power is withdrawn from the motor 15 (FIG. 2) but is maintained in all other circuits corresponding to the "Scan" position. The purpose of "Hold" is to stop the scanning combustion unit 16 at a given position along the tube 12 (FIG. 2) in order to concentrate heat at a particular position. "Hold" is indicated on the recorder 19 (FIG. 2) chart by a mark placed by an event marker shown as 19 in FIG. 3.

Numerous variations of the described system may be incorporated for specific analyses, either to render the system more versatile or for other purposes. By way of example, rather than analyze a developed chromatogram, the inventive apparatus may be used for the comparative qualitative or quantitative analysis of a series of unresolved samples with each sample being placed at a different longitudinal location in the tube 12. As another illustration of the system's versatility, the initial sample development may be with types of chromatography other than TLC. Also, particularly where the dissolved components are readily oxidized, the oxidant can be an oxygen-containing carrier gas. In addition, the tube 12 may be replaced by an enclosed plate, although at some loss of peak sharpness.

Thus it is apparent that there has been provided, according to the invention, an apparatus and method that fulfill the objects, aims, and advantages set forth earlier.

We claim as our invention:

1. In apparatus for analyzing a chromatographically developed mixture, including a conduit containing a chromatographically active adsorbent, means for heating a zone of said conduit, means for advancing said zone longitudinally of said conduit to thereby change the composition of said carrier gas, and means for determining changes in composition of said carrier gas as a measure of the composition of said mixture, the improvement characterized in that said zone contains a substance capable of decomposing compounds in said mixture to gasiform products at the temperature of said zone.

2. Apparatus of claim 1 wherein said substance and said adsorbent are internally coated on said conduit.

3. Apparatus of claim 1 wherein said substance is a metal oxide oxidant.

4. Apparatus for analyzing a chromatographically developed mixture, comprising:
   a. means for flowing a carrier gas through an elongated tubular conduit containing, in combination, a chromatographically active adsorbent and a substance capable of decomposing adsorbed compounds to gasiform products at elevated temperature,
   b. means for heating a zone of said conduit to said elevated temperature,
   c. means for advancing said heating means longitudinally of said elongated tubular conduit to decompose progressive increments of said chromatographically developed mixture to gasiform products,
   d. and means for determining the resulting change in composition of said carrier gas as a measure of the composition of said mixture.

5. Apparatus of claim 4 wherein said carrier gas is an inert gas.

6. Apparatus of claim 5 wherein said carrier gas is helium.

7. Apparatus of claim 4 wherein said tubular conduit is internally coated with said combination.

8. Apparatus of claim 4 including means for recording said carrier gas composition changes.

9. Apparatus of claim 4 wherein said adsorbent is silica gel or alumina.

10. Apparatus of claim 4 wherein said substance is a metal oxide oxidant.

11. Apparatus of claim 10 wherein said metal oxide is cupric oxide.

12. Apparatus of claim 4 wherein said substance is a cracking catalyst.

13. Apparatus of claim 4 wherein said carrier gas composition change determining means is a catharometer.

14. Apparatus of claim 4 wherein said carrier gas composition change determining means is a radioactivity measuring device.

15. Apparatus of claim 4 including means for removing water vapor from said carrier gas downstream of said conduit and prior to said carrier gas composition change determining means.

16. Apparatus of claim 4 including supplemental oxidation means downstream of said conduit and prior to said carrier gas composition change determining means.

17. A method for analyzing a chromatographically developed mixture, comprising:
   a. flowing a carrier gas through an elongated tubular conduit containing, in combination, a chromatographically active adsorbent and a substance capable of decomposing adsorbed compounds to gasiform products at elevated temperature,
   b. heating a zone of said conduit to said elevated temperature,
   c. advancing said heating means longitudinally of said elongated tubular conduit to decompose progressive increments of a chromatographically developed mixture to gasiform products,
   d. and determining the resulting change in composition of said carrier gas as a measure of the composition of said mixture.

18. Method of claim 17 wherein said chromatographically developed mixture is a thin layer chromatogram.

19. Method of claim 17 wherein said advancement is in a direction opposite the direction of chromatographic development.

20. Method of claim 17 wherein said tubular conduit is internally coated with said combination.

21. Method of claim 18 wherein said carrier gas is helium.

22. Method of claim 17 wherein said adsorbent is silica gel or alumina.

23. Method of claim 17 wherein said substance is a metal oxide oxidant.

24. Method of claim 23 wherein said metal oxide is cupric oxide.

25. Method of claim 17 wherein said substance is a cracking catalyst and said carrier gas comprises hydrogen.

26. A thin layer chromatography tube comprising an elongated tubular conduit having an internal surface comprising, in combination, a chromatographically active adsorbent and a substance capable of decomposing adsorbed compounds to gasiform products at elevated temperature.

27. Tube of claim 26 wherein said surface is an internal coating.

28. Tube of claim 26 wherein said adsorbent is silica gel.

29. Tube of claim 26 wherein said adsorbent is alumina.

30. Tube of claim 26 wherein said adsorbent is a molecular sieve.

31. Tube of claim 26 wherein said substance is a metal oxide oxidant.

32. Tube of claim 26 wherein said metal oxide is cupric oxide.

33. Tube of claim 26 wherein said substance is a cracking catalyst.

34. Tube of claim 26 wherein said conduit has an outside diameter between about one-sixteenth and about one-half inches.

35. Tube of claim 26 wherein said conduit is necked down to reduced dimension near one end thereof.

* * * * *